UNITED STATES PATENT OFFICE.

HUGH B. STINSON, OF HANCOCK, MINNESOTA.

WELDING COMPOUND.

SPECIFICATION forming part of Letters Patent No. 366,273, dated July 12, 1887.

Application filed October 30, 1886. Serial No. 217,584. (No specimens.)

*To all whom it may concern:*

Be it known that I, HUGH B. STINSON, a citizen of the United States, residing at Hancock, in the county of Stevens and State of Minnesota, have invented certain new and useful Improvements in Welding Compounds; and I do declare the following to be a full, clear, and exact description of the invention, such as will enable others skilled in the art to which it appertains to make and use the same.

This invention relates to an improved welding compound, which consists of the following ingredients, in the proportions specified: borax, one pound; rosin, one-half pound; beeswax, one ounce.

In preparing the compound the borax is pulverized and thoroughly mixed with the rosin and beeswax, which are melted. The mass is then molded into any desired form and allowed to cool, when it is in readiness for use.

In practice the compound is pulverized and strewn upon the parts to be welded in the ordinary manner. The borax and rosin is the flux and the beeswax is a carrying medium, and serves also to exclude the air from the parts during the process of welding. Borax, being an efflorescent salt, is gradually decomposed when exposed to the action of the air. Thus when kept for any length of time it deteriorates in value and loses its strength. The beeswax in my compound cures this defect, as it envelops, and in fact encysts, the particles of the borax and shields them from the ravages of the moisture in the air.

Having thus described my invention, what I claim, and desire to secure by Letters Patent, is—

The herein-described welding compound, composed of the following ingredients: borax, rosin, and beeswax, in about the proportions specified.

In testimony whereof I affix my signature in presence of two witnesses.

HUGH B. STINSON.

Witnesses:
S. A. FLOHERTY,
B. J. VAN VALKENBURGH.